(12) United States Patent
Hotanen et al.

(10) Patent No.: US 12,017,799 B2
(45) Date of Patent: Jun. 25, 2024

(54) NOZZLE AND APPARATUS FOR COOLING JET ENGINE FOR MAINTENANCE AND METHOD FOR MAINTENANCE OF JET ENGINE

(71) Applicant: FCS Finland Oy, Masku (FI)

(72) Inventors: Pauli Hotanen, Rusko (FI); Ville-Veikko Lahtonen, Nousiainen (FI)

(73) Assignee: FCS Finland Oy, Masku (FI)

( * ) Notice: Subject to any disclaimer, the term of this patent is extended or adjusted under 35 U.S.C. 154(b) by 162 days.

(21) Appl. No.: 17/049,875

(22) PCT Filed: Apr. 24, 2019

(86) PCT No.: PCT/FI2019/050330
§ 371 (c)(1),
(2) Date: Oct. 22, 2020

(87) PCT Pub. No.: WO2019/211518
PCT Pub. Date: Nov. 7, 2019

(65) Prior Publication Data
US 2021/0140342 A1    May 13, 2021

(30) Foreign Application Priority Data
May 2, 2018 (FI) ..................................... 20185402

(51) Int. Cl.
*B64F 1/36* (2024.01)
*B60K 11/06* (2006.01)
*F01D 25/12* (2006.01)
*F01D 25/28* (2006.01)
(Continued)

(52) U.S. Cl.
CPC .............. *B64F 1/364* (2013.01); *B60K 11/06* (2013.01); *B64F 1/362* (2013.01); *F01D 25/12* (2013.01);
(Continued)

(58) Field of Classification Search
CPC .......... B60K 11/06; B64F 1/362; B64F 1/364; F01D 25/12; F01D 25/285; F01D 25/305; F02K 1/52
See application file for complete search history.

(56) References Cited

U.S. PATENT DOCUMENTS 5,114,098 A    5/1992  Campbell
5,899,217 A    5/1999  Testman, Jr.
(Continued)

FOREIGN PATENT DOCUMENTS

CN        202170019 U        3/2012
CN        104691777 A    *   6/2015
(Continued)

OTHER PUBLICATIONS

Human translation of CN 106494639 A (Year: 2017).*
(Continued)

*Primary Examiner* — Christopher R Legendre
(74) *Attorney, Agent, or Firm* — Laine IP Oy; Mark W. Scott

(57) ABSTRACT

A nozzle for cooling a jet engine for maintenance is described. The jet engine includes an exhaust channel for the exit of exhaust gases of the jet engine, the nozzle includes a suction adapter having a round shape adapted to be connected in a sealed manner to the exhaust channel for sucking air from the exhaust channel, and a suction channel in fluid connection with the suction adapter for sucking air from the suction adapter. The suction channel is arranged to be connected to an air suction device. An apparatus for cooling a jet engine for maintenance and a method for maintenance of a jet engine are also described.

10 Claims, 2 Drawing Sheets

(51) Int. Cl.
  *F01D 25/30* (2006.01)
  *F01P 1/06* (2006.01)
  *F02K 1/80* (2006.01)
(52) U.S. Cl.
  CPC ......... *F01D 25/285* (2013.01); *F01D 25/305* (2013.01); *F01P 1/06* (2013.01); *F02K 1/805* (2013.01); *F05D 2220/323* (2013.01); *F05D 2230/72* (2013.01)

(56) References Cited

U.S. PATENT DOCUMENTS

| | | |
|---|---|---|
| 2011/0232697 A1 | 9/2011 | Amcoff et al. |
| 2021/0140342 A1* | 5/2021 | Hotanen .................. F01D 25/30 |
| 2022/0252010 A1* | 8/2022 | Millhaem ............. F01D 25/285 |

FOREIGN PATENT DOCUMENTS

| | | |
|---|---|---|
| CN | 104691777 A | 6/2015 |
| CN | 106494639 A | 3/2017 |
| JP | H02100999 U | 8/1990 |
| JP | 2013531160 A | 8/2013 |
| WO | 2008/025940 A1 | 3/2008 |

OTHER PUBLICATIONS

International Search Report mailed Aug. 13, 2019 for International Application No. PCT/FI2019/050330.
Office Action dated Jan. 13, 2022 in Japanese Patent Application No. 2021-510549, and Machine English translation thereof.

* cited by examiner

NOZZLE AND APPARATUS FOR COOLING JET ENGINE FOR MAINTENANCE AND METHOD FOR MAINTENANCE OF JET ENGINE

FIELD OF THE DISCLOSURE

The present disclosure relates to the maintenance of a jet engine, and particularly to a nozzle for cooling a jet engine for maintenance. The present disclosure further concerns an apparatus for cooling a jet engine for maintenance and a method for maintenance of a jet engine.

BACKGROUND OF THE DISCLOSURE

Jet engines, especially in aviation, need to be serviced frequently in order to ensure their reliable operation. Due to economic reasons, the maintenance time must be kept as short as possible for allowing as many hours of operation as possible between the maintenance breaks.

When a jet engine is used, it heats up. Maintenance operations cannot be performed to the hot jet engine and thus it needs to be cooled. This cooling can be performed simply by turning off the jet engine and waiting until the jet engine has cooled by itself. This waiting, however, extends the duration of the maintenance break.

Alternatively, the jet engine can be cooled by sucking air from the exhaust channel of the jet engine with a suction pipe arranged to the exhaust channel. This can be made more effective by sealing the remainder of the exhaust channel for example with a plastic film and tape. Installing the sealing is, however, time consuming and difficult.

BRIEF DESCRIPTION OF THE DISCLOSURE

An object of the present disclosure is to provide a nozzle, an apparatus comprising the nozzle and a method utilizing the apparatus so as to overcome the above problems.

The object of the disclosure is achieved by a nozzle, an apparatus comprising the nozzle and a method utilizing the apparatus which are characterized by what is stated in the independent claims. The preferred embodiments of the disclosure are disclosed in the dependent claims.

The disclosure is based on the idea of providing a nozzle for cooling a jet engine for maintenance, wherein the nozzle comprises a suction adapter having a round shape adapted to be connected in sealed manner to the exhaust channel of a jet engine for sucking air from the exhaust channel, and a suction channel in fluid connection with the suction adapter for sucking air from the suction adapter, wherein the suction channel is arranged to be connected to an air suction device.

An advantage of the nozzle of the disclosure is that it allows quick attachment to the exhaust of a jet engine without the need for manual seal fixing and taping and thus the cooling can be initiated quickly after the jet engine is received to the maintenance.

BRIEF DESCRIPTION OF THE DRAWINGS

In the following the disclosure will be described in greater detail by means of preferred embodiments with reference to the accompanying drawings, in which.

DETAILED DESCRIPTION OF THE DISCLOSURE

The disclosure relates to a nozzle 12 for cooling a jet engine 2 for maintenance. For example, the jet engine 2 is a turbojet engine, a turbofan engine or a turboprop engine. The jet engine 2 comprises an exhaust channel 21 for the exit of exhaust gases of the jet engine 2. These hot exhaust gases are utilized to produce thrust. The exhaust channel 21 may be formed by a passage between an exhaust pipe, or an exhaust case, and an exhaust cone arranged coaxially at the rear portion of the jet engine 2. Alternatively, the exhaust channel 21 may be formed solely by the exhaust pipe. In some cases, the exhaust pipe extends longitudinally beyond the exhaust cone and thus the end of the exhaust channel 21, or an exhaust nozzle, is formed solely by the exhaust pipe.

Figure 2:
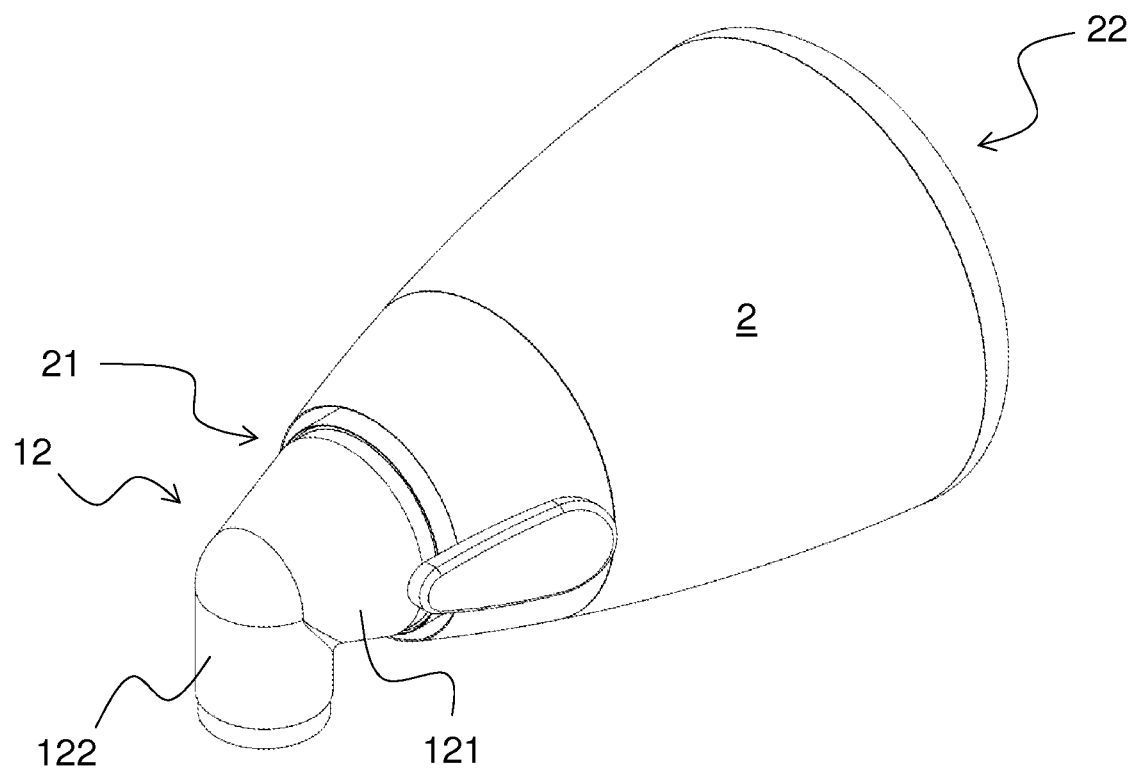
FIG. 2 illustrates a nozzle according to an embodiment of the disclosure connected to an exhaust channel of a jet engine.

The nozzle 12 comprises a suction adapter 121. The suction adapter 121 is adapted to be connected in sealed manner to the exhaust channel 21 of the jet engine 2 for sucking air from the exhaust channel 21 for cooling the jet engine 2. In this case, the connection in sealed manner means that essentially no air is leaked between the exhaust channel 21 and the suction adapter 121. Connection between the suction adapter 121 and the exhaust channel 21 is illustrated in FIG. 2. According to an embodiment, the suction adapter 121 comprises elastic material for forming a seal with the exhaust channel 21. For example, the suction adapter is 121 is made of rigid material, such as plastic. According to an embodiment, the suction adapter 121 comprises at least one rim 121a, and the rim 121a is provided with an elastic seal. Alternatively, the suction adapter 121 itself can be made essentially of elastic material, such as silicone rubber, and it is optionally provided with a rigid support structure for supporting the elastic part of the suction adapter 121.

The nozzle 12 comprises a suction channel 122. The suction channel 122 is in fluid connection with the suction adapter 121 for sucking air from the suction adapter 121. The suction channel 122 is arranged to be connected to an air suction device 13.

Figure 1:
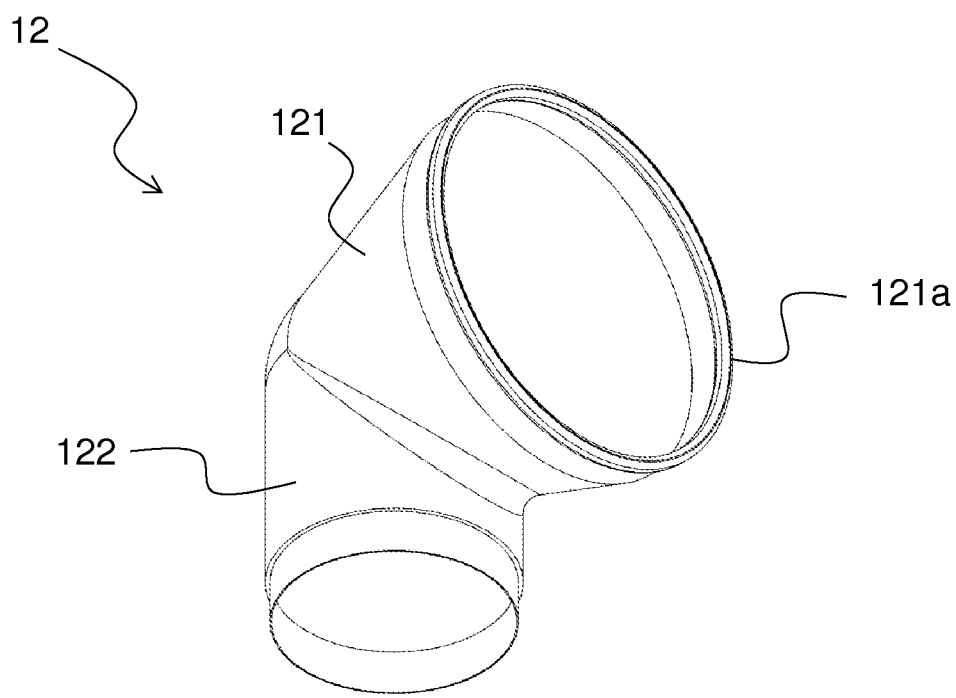
FIG. 1 is an angled view of a nozzle according to an embodiment of the disclosure.

The suction adapter 121 has a round shape. The round shape facilitates the connection to the exhaust channel 21 having a corresponding round shape. According to an embodiment, the suction adapter 121 has a conical shape. In this case, the suction adapter 121 comprises one rim 121a formed at the annular periphery of the conical shape. The conical-shaped suction adapter 121 is suitable for jet engines in which the exhaust channel is formed by an exhaust pipe and an exhaust cone, and jet engines in which the exhaust channel, or at least the exhaust nozzle, is formed solely by exhaust pipe. When the nozzle 12 is used, the conical suction adapter 121 is fitted to the exhaust of the jet engine 2 so that the rim 121a comes in contact with the exhaust pipe or the exhaust nozzle. A conical-shaped suction adapter 121 is illustrated in FIGS. 1 and 2.

Figure 3:
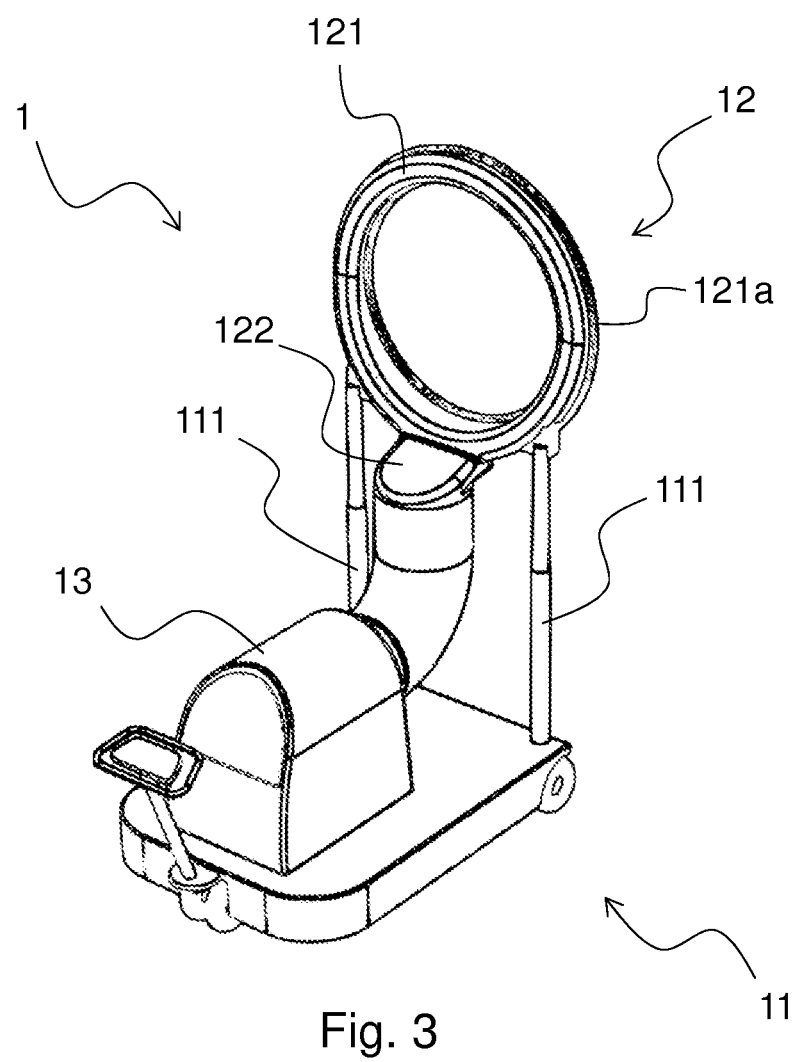
FIG. 3 is an angled view of an apparatus according to an embodiment of the disclosure.

According to an alternative embodiment, the suction adapter 121 has an annular shape having a U-shaped cross-section for forming a semi-open annular channel, and the suction channel 122 is connected to the periphery of the semi-open annular channel of the annular suction adapter 121. In this case, the suction adapter 121 comprises two rims 121a formed at the inner periphery and the outer periphery of the semi-open annular channel. The annular suction adapter 121 is suitable for jet engines in which the exhaust channel is formed by an exhaust pipe and an exhaust cone. When the nozzle 12 is used, the annular suction adapter 121 is fitted between the exhaust pipe and the exhaust cone so that the inner rim 121a comes in contact with the exhaust cone and the outer rim 121a comes in contact with the exhaust pipe. An annular-shaped suction adapter 121 is illustrated in FIG. 3.

The disclosure relates also to an apparatus 1 for cooling a jet engine 2 for maintenance. The apparatus 1 comprises a frame 11 arranged to support the apparatus 1 movably on the ground. For example, the frame 11 has been provided with wheels at the bottom of the frame.

The apparatus 1 comprises a nozzle 12 as described above. The nozzle 12 is supported by the frame 11. For example, the frame 11 comprises at least one support arm 111 and the nozzle 12 is supported by the support arm 111.

Preferably, the nozzle 12 is arranged detachably to the apparatus 1. This allows selecting and replacing the nozzle 12 according to the type of the jet engine in question.

According to an embodiment, the frame 11 comprises location adjustment means for adjusting the vertical location of the nozzle 12 in relation to the frame 11. For example, the location adjustment means are arranged at the support arm 111. For example, the support arm 111 has a telescopic structure for modifying its length. The purpose of the location adjustment means is to allow using the apparatus 1 for cooling jet engines 2 of airplanes having the jet engines 2 at different heights from the ground.

The apparatus 1 comprises an air suction device 13 connected to the nozzle 12 for sucking air from the nozzle 12. For example, the air suction device 13 is a suction fan. According to an embodiment, the air suction device 13 is also able to blow air to the nozzle 12.

The disclosure relates also to a method for maintenance of a jet engine 2. The method comprises providing a jet engine 2 comprising an exhaust channel 21 for the exit of exhaust gases of the jet engine 2. The jet engine 2 has heated during use of the jet engine 2. The nozzle 12 of an apparatus 1 as described above is connected to the exhaust channel 21. Then air is sucked from the exhaust channel 21 with the apparatus 1 for cooling the jet engine 2. Then maintenance operations are performed to the cooled jet engine 2.

The jet engine 2 comprises an air inlet 22 that is in fluid connection with the exhaust channel 21. According to an embodiment, the method comprises feeding cooled air to the air inlet 22. In this case, the cooled air flows from the air inlet 22 through the jet engine 2 to the exhaust channel 21 and onwards to the apparatus 1. Cooled air relates to air that is cooler than ambient air. Feeding cooled air to the inlet 22 makes the cooling of the jet engine 2 more efficient.

The invention claimed is:

1. An apparatus for cooling a jet engine for maintenance, wherein the jet engine comprises an exhaust channel for the exit of exhaust gases of the jet engine, and wherein the apparatus comprises:
a nozzle, the nozzle comprising:
a suction adapter having an annular shape configured to correspond to a shape of the exhaust channel, wherein the suction adapter comprises a semi-open annular channel defined between a first rim at an inner periphery of the semi-open annular channel and a second rim at an outer periphery of the semi-open annular channel, wherein the suction adapter comprises an elastic material configured to form a seal with the exhaust channel, and wherein the suction adapter is configured to be sealably connected to the exhaust channel;
a suction channel in fluid connection with the suction adapter, wherein the suction channel is connected to the semi-open annular channel of the suction adapter; and
an air suction device connected to the suction channel, wherein the air suction device sucks air from the exhaust channel of the jet engine to cool the jet engine.

2. The apparatus according to claim 1, wherein the elastic material is provided at the first and second rims.

3. A method for maintenance of a jet engine, wherein the method comprises steps of:
providing the jet engine which comprises an exhaust channel for channeling exhaust gases of the jet engine,
connecting the apparatus of claim 1 to the exhaust channel, wherein the apparatus further comprises a frame arranged to support the apparatus movably on the ground,
sucking air from the exhaust channel with the apparatus for cooling the jet engine, and
performing maintenance operations to the cooled jet engine.

4. The method according to claim 3, further comprising:
adjusting a vertical location of the nozzle in relation to the frame.

5. An arrangement for cooling a jet engine for maintenance, the arrangement comprising:
a jet engine comprising an exhaust channel, which is formed by an exhaust pipe and an exhaust cone, and
an apparatus for cooling the jet engine for maintenance, wherein the apparatus comprises:
a frame arranged to support the apparatus movably on the ground,
a nozzle comprising:
a suction adapter having an annular shape configured to correspond to a shape of the exhaust channel, wherein the suction adapter comprises an elastic material that forms a seal with the exhaust channel, and wherein the suction adapter is fitted between the exhaust pipe and the exhaust cone of the jet engine and is sealably connected to the exhaust channel, and
a suction channel in fluid connection with the suction adapter, wherein the suction channel is connected to a periphery of the suction adapter,
an air suction device connected to the suction channel, wherein the air suction device sucks air from the exhaust channel of the jet engine to cool the jet engine,
wherein the nozzle is supported by the frame, and
wherein the air suction device is connected to the nozzle for sucking air from the nozzle.

6. The arrangement according to claim 5, wherein the frame comprises location adjustment means for adjusting a vertical location of the nozzle in relation to the frame.

7. The arrangement according to claim 6, wherein the location adjustment means comprises at least one support arm.

8. The arrangement according to claim 7, wherein the at least one support arm has a telescopic structure for modifying a length thereof.

9. The arrangement according to claim 6, wherein the frame includes wheels at a bottom of the frame.

10. The arrangement according to claim 5, wherein the suction adapter includes an inner rim and an outer rim; and
wherein the inner rim contacts the exhaust cone of the jet engine and the outer rim contacts the exhaust pipe of the jet engine.

* * * * *